(No Model.)  3 Sheets—Sheet 1.
R. O. WOOD.
BRAKE MECHANISM.
No. 495,717. Patented Apr. 18, 1893.
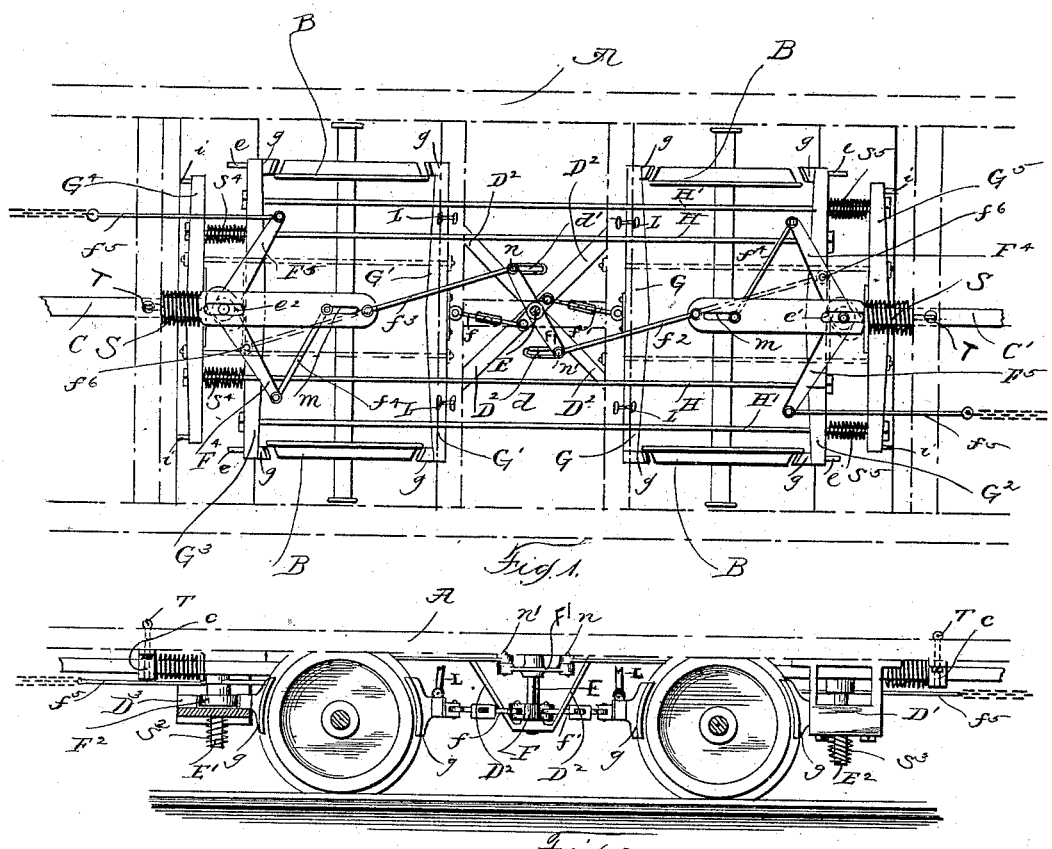
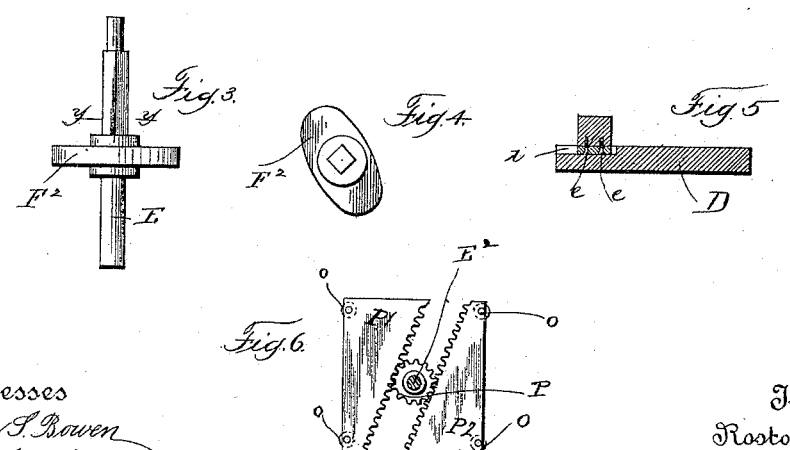
Witnesses
Walter S. Bowen
J. B. Wood
Inventor
Rosto O. Wood (No Model.) 3 Sheets—Sheet 2.
R. O. WOOD.
BRAKE-MECHANISM.
No. 495,717. Patented Apr. 18, 1893.
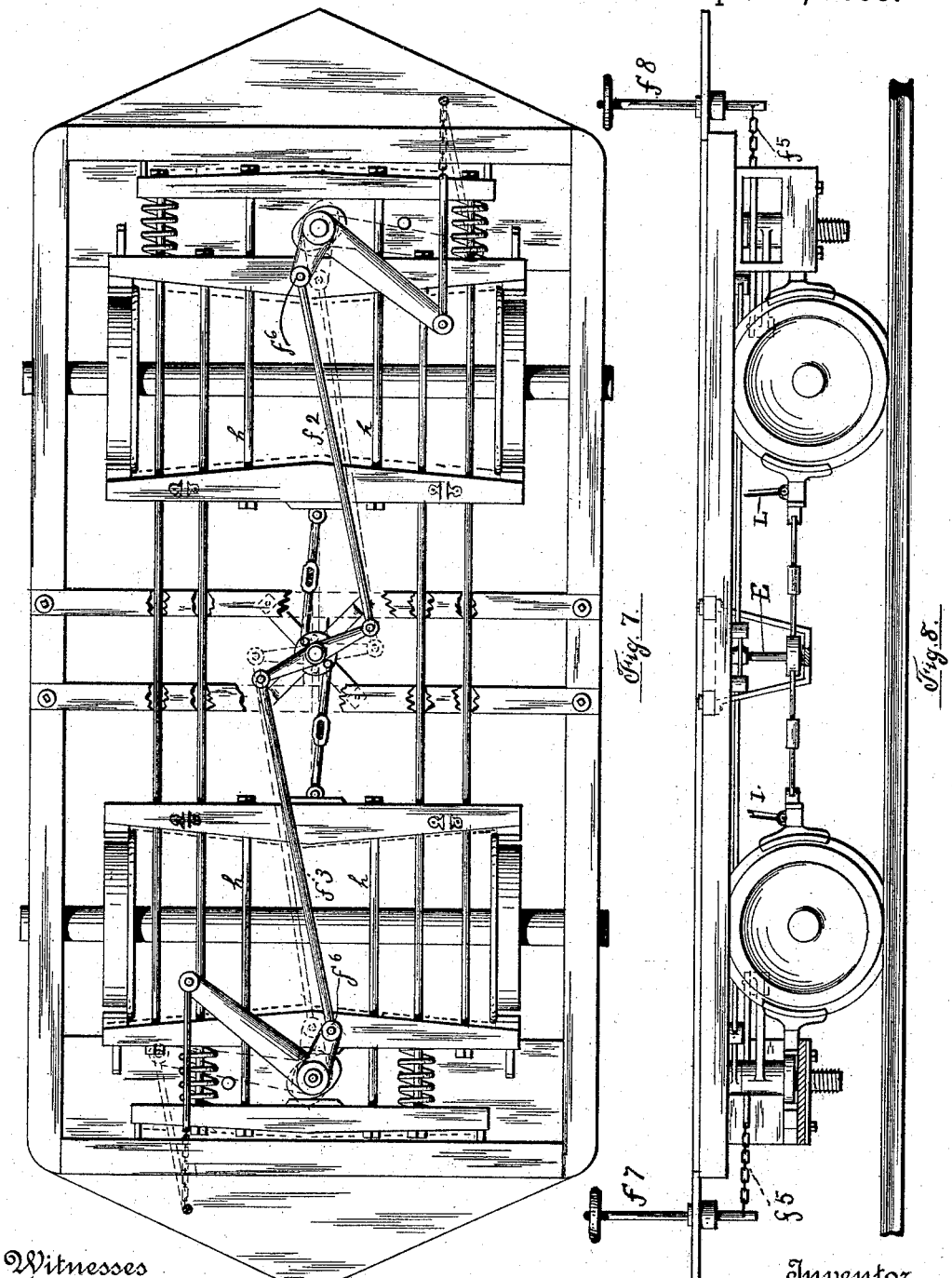
Witnesses
F. A. Cutter.
J. B. Wood
Inventor
Rosco O. Wood.

(No Model.) 3 Sheets—Sheet 3.
R. O. WOOD.
BRAKE MECHANISM.
No. 495,717. Patented Apr. 18, 1893.
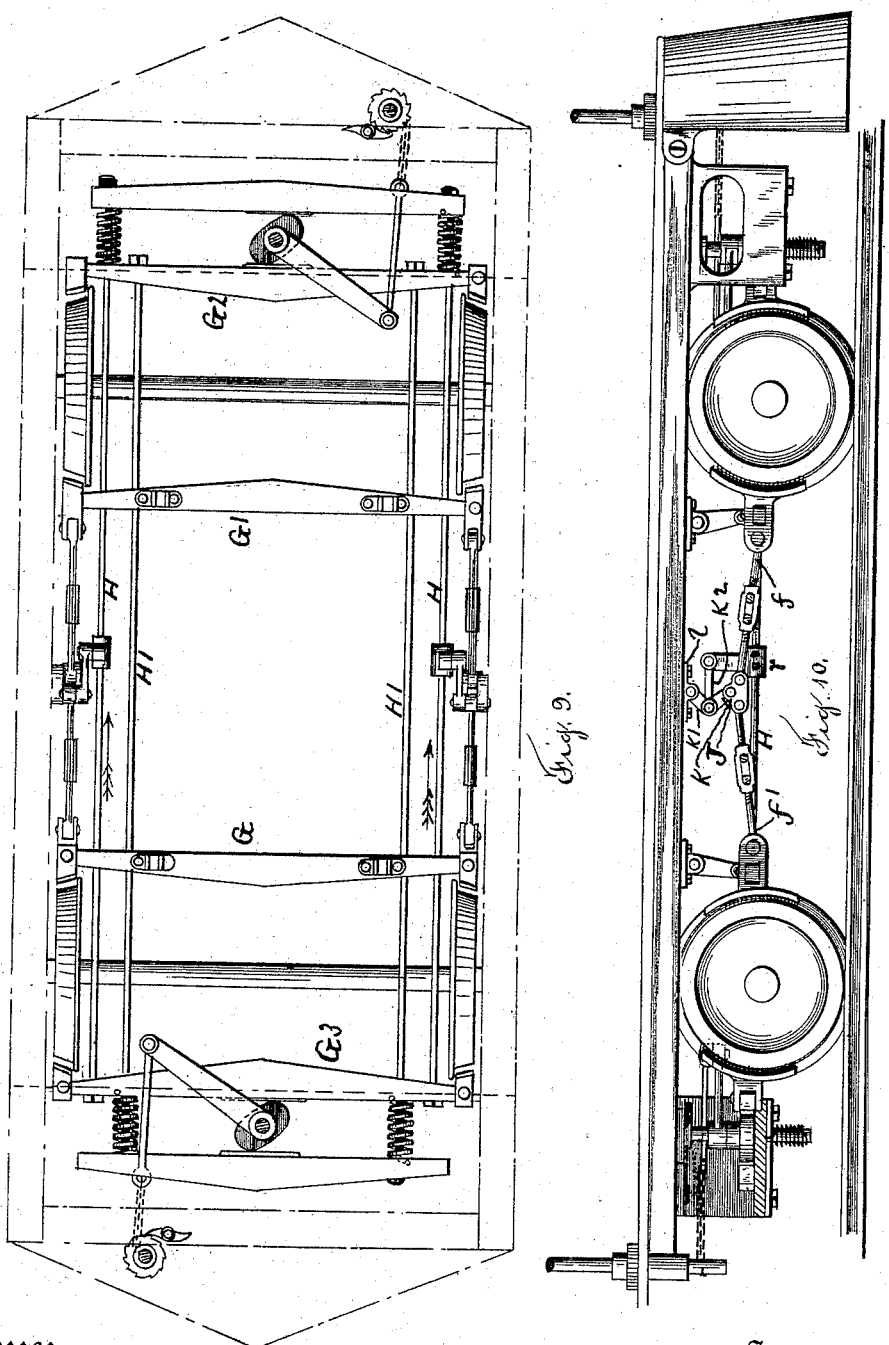
Witnesses
Walter S. Bowen
J. B. Wood
Inventor
Roots O. Wood

UNITED STATES PATENT OFFICE.

ROSTO ORRIN WOOD, OF WORCESTER, MASSACHUSETTS, ASSIGNOR OF ONE-HALF TO W. MARTIN JONES, OF ROCHESTER, NEW YORK.

BRAKE MECHANISM.

SPECIFICATION forming part of Letters Patent No. 495,717, dated April 18, 1893.

Application filed August 21, 1890. Serial No. 362,680. (No model.)

*To all whom it may concern:*

Be it known that I, ROSTO ORRIN WOOD, a citizen of the United States, and a resident of Worcester, county of Worcester, and State of Massachusetts, have invented a new and useful Improvement in Brake Mechanisms, of which the following is a specification, accompanied by drawings forming a part of the same, and together containing a full, clear, and exact description of my invention.

Referring to the drawings: Figure 1 represents a top plan view of the car truck, with my improved brake mechanism applied thereto. Fig. 2 is a sectional longitudinal side elevation of the same on line $x\,x$ showing the double cam in position for operation. Figs. 3, 4 and 5 show enlarged details of some parts of my brake mechanism. Fig. 6 shows a modification of the double cam device for operating the parallel bars. Figs. 7 and 8 represent my mechanism as adapted to electric cars. Figs. 9 and 10 show a modification of the mode of operating the "toggle-joint" mechanism.

Similar letters refer to similar parts in the different figures.

My invention relates to a mechanism by which the brake shoes can be applied to the wheels of a car or other vehicle, either by the brakeman standing on the platform of the car, or other convenient position, or by the reversal of the propelling power as it is applied to the vehicle, and it consists in the arrangement and the construction of the several parts as illustrated in the drawings and hereinafter described and specifically pointed out in the subjoined claims.

In the accompanying drawings the mechanism forming the subject of my invention is represented as applied to the wheels of a street car and the modifications and changes in order to adapt it to other vehicles will be readily seen without a detailed illustration or description.

In Fig. 1 A denotes a portion of the body of a street car, indicated by dotted lines, B the wheels, and C C the draw-bars by which it is drawn.

D' and D³ represent a framework depending from the body of the car on its under surface to support the brake-operating mechanism, and D² another form of support or iron hangers suspended from the car for the same purpose.

Journaled at one end to the frame of the car, or a bracket thereto attached, and to a similar bracket or step rigidly attached to said frame work, is a shaft E in a vertical position, by preference, as shown in Fig. 2 (though it may be placed in a horizontal position and transversely to the vehicle, without departing materially from the spirit of my invention.) On the vertical shaft E, I place a short, radial arm or flange F, and rigidly attach it thereto. Pivotally connected therewith, and opposite each other, are two short links $f\,f'$, provided with turn-buckles or adjusting screws for purposes further on explained.

G is a brake-bar provided with supporting-rods L L pivotally connected to the upper surface of brake-bar G at one end, and to the under surface of the car at the other end, in near proximity to the wheel. To said brake-bar G brake-shoes $g\,g$ are attached, and adapted to exactly fit the convex surface of the periphery of the wheel. On its outer surface and nearest to shaft E, a bracket is attached which is pivotally connected to the other end of said short links $f\,f'$, thereby connecting the brake-shoes on the inner peripheral surfaces of the wheels with the central shaft E through intermediate mechanism as above explained. To said central shaft E is also rigidly attached a long, radial arm F', each end of which is provided with studs $n\,n'$, entering slots $d\,d'$ in the connecting links $f^2\,f^3$, which are pivoted at their opposite ends to the draw-bars C C (see Fig. 1). Two other shafts, E' and E² are placed one at each end of the car beneath the platform, and are each provided with double cams F² and F³, as shown by dotted lines in Fig. 1. The cams are firmly attached, either by set screws or made to tightly fit the square surfaces of shaft, shown in Fig. 3. On each of said shafts E' and E², above the double cam are also attached in similar manner, radial arms F⁴ and F⁵ made independent of each other, or cast in one piece. (See Fig. 1.) Pivotally connected at each of the free ends of said radial arms, F⁴ and F⁵ are links $f^4$ and $f^5$, links $f^4$ being pivoted to the slotted portion of the posterior end of the drawbar by which the vehicle is drawn, and link $f^5$ being provided with a short chain or other flexible extension leading to and attached to the lower end of a vertical shaft of ordinary construction having at its other end a wheel or crank for the use of the brakeman standing on the platform of the car, (as shown in Figs. 8 and 10.)

The long connecting links $f^2$ and $f^3$ connecting the draw-bar at either end of the car with the long radial arm on the central shaft E, are slotted at the end thereto attached, for the purpose of permitting an independent motion by one connecting link, without imparting motion to the other. On either side of said double cams, (indicated in Fig. 1 by dotted lines,) and in close contact therewith are two brake-bars $G^2$ and $G^3$. On the other side of said cams and parallel to said brake-bars $G^2$ and $G^3$ are supplementary bars $G^4$ and $G^5$. These brake bars are connected as follows by iron rods H and H'. Brake bar $G^2$ is connected to supplemental bar $G^4$ at the other end of the car and brake-bar $G^3$ and supplemental bar $G^5$ are similarly connected. Each supplemental bar may also be similarly connected to the brake-bars G and G', as indicated in Fig. 7 at $h$, and by dotted lines in Fig. 1; so also may the long connecting links $f^2$ and $f^3$ (connecting the long radial arms on the central shaft with the posterior ends of the draw-bars) be made of one continuous rod, (as indicated in Fig. 7 and by dotted lines in Fig. 1) from the end of the draw-bar where now pivoted, and extended to the radial arm $F^4$ (at $f^6$) and pivotally connected therewith, or said extension piece may be an independent link of itself connecting said radial arm at $f^6$ with the extreme posterior end of draw-bar as shown by dotted lines in Fig. 1.

Each of the draw-bars is provided with a hole through which a stop-pin T, passes, (at $c, c$, Fig. 2) preventing a rearward motion of the draw-bar when the brake mechanism is not needed; and they are also provided with two other slots, $e'$ and $e^2$ at the points through which the shafts E' and $E^2$ pass, and which will prevent a rearward motion of said draw-bar farther than is necessary to apply the brakes which are operated by the "toggle-joint" mechanism on the central shaft. The slot $m$ near the posterior end of the draw-bar in conjunction with the slotted end of the connecting link ($d, d'$ in Fig. 1) attached to the long radial arm on the central shaft, permits the draft of the draw-bar forward without affecting the brake mechanism.

The construction and arrangement of the shafts E' and $E^2$ and their connections with intermediate mechanism to and with the long radial arm as above described, are similar, and permit each and every combination of one, two, or all brake bars to be operated independently of, or in conjunction with each other, according to the amount of braking power required; and also, as will be seen, the various combinations may be operated by the reversal of the draw-bar, independently of the brakeman, or driver, or in conjunction therewith.

The springs S, S, surrounding the draw-bars prevent a sudden resistance when the propulsive force is applied to move the car forward. The springs $S^2$, $S^3$, (see Fig. 2) are for purposes of returning the shafts with cams thereon to their normal position, thereby removing the brake shoes from the wheels when not needed, and the springs $S^4$ and $S^5$ furnish additional force for that purpose. Any convenient form of spring may be used for said purpose. Guides on the parallel bars (at $e$) are provided if necessary with grooves adapted to fit them shown at $i$, Fig. 5.

In Fig. 6 I have shown a slight modification of the double cam device for operating the parallel bars, but as it embodies the cam principle, and may be used for the same purpose, (and instead of the cam) I will explain its application and operation. It consists of a small pinion, P, which is rigidly attached to the shaft $E^2$ in the same manner as is the double cam and on either side of which are triangular pieces, P' and $P^2$ with gear teeth on their inner surfaces next to the pinion, and the outer edge coming in sliding contact with each of the parallel bars. To prevent excessive friction four small wheels, $o, o, o, o$, are provided, one at each corner of the outer edge, and it must be seen that as the shaft is rocked the parallel bars will be forced apart, as in the case with the other cam device. Turn-buckles or adjusting screws may be placed upon any of the links in this mechanism as shown on short links $f, f'$ in Fig. 2 for purposes of adjusting the distance between the brake shoes and the wheel. In Figs. 7 and 8 I have shown its adaptability to electric cars and the position of the parts referred to by dotted lines in Fig. 1 when the draw-bar is not required. In Fig. 7 it will be observed that the long connecting links $f^2$ and $f^3$ are attached to a short arm representing the point of attachment $f^6$ in Fig. 1 which operate the central shaft E, and which, when the brake shoes are applied with the intermediate mechanism will be in position as shown by dotted lines. (See Fig. 7.) It must be seen that the long connecting link attachment to the short radial arm at $f^6$ operating the short arm or flange F straightening the links $f$ and $f'$ acts as a double "toggle joint" mechanism for purposes of applying the brake shoes to the peripheries of the wheels on their inner edges nearest the center of the car.

In Fig. 8 I have also shown the connection of the short chain attachment to connecting link $f^5$ with the vertical shafts $f^7$ and $f^8$ operated by the brakeman on the platform of the car. In Figs. 9 and 10 I have shown a slight modification of the "toggle joint" mechanism for operating the brake shoes on the inner edge of the wheel nearest to the center of the car. In this the two connecting links $f$ and $f'$ are attached to a flange J, in a vertical position and above the axis of a horizontal plane with the brake bars, to which they are also attached at the other end. To said flange J, near its upper edge a link, K, is pivotally attached, and pivotally connected therewith at its opposite end is link K′, said link K′ being pivotally connected at the other end to a bracket *l* which is rigidly attached to the under surface or frame of the car. At the junction of links K and K′ is link K² pivotally connected therewith, the other end of link K² being pivotally attached to a lug *r* which is rigidly attached to the long rods H, H.

The operation of my brake mechanism is as follows:—As the draw-bars, (or either of them) are pushed back by the reversal of the power by which the car is drawn, as would occur upon the descent of a hill, or by the stopping of the horses, in order to arrest the motion of the car, the shaft E is rocked by means of the connecting link connected with the reversed draw-bar and the connected radial arm upon the shaft E, rocking said shaft, and forcing the short links around in position on a line with the center of the posterior end of the draw-bar thereby thrusting the brake-shoes against the peripheries of the wheels, nearest the center of the car, or the central shaft E. Simultaneously with the operation just described, the shafts E′ and E² are rocked by means of the radial arm attachments to said shafts, and to the slotted portion of the posterior end of the draw-bar, operating in such a manner above described as to cause the brake-bars at each end of the car to be operated, thereby forcing all the brake-shoes to bear against the peripheries of the wheels, at one and the same time. When the propelling force is again applied to move the car forward, the brake-shoes are removed from the peripheries of the wheels either by the action of the springs or by the action of the hangers attached to the brake-bars, supporting them in position from the under surface of the car, allowing the brake shoe to be removed from the wheel by the force of gravitation.

To prevent the brakes being applied should it be desired to force a car rearward, a stop-pin, T, is provided, passing down through the platform of the car, near the hand brake wheel, and through the hole *c*, in the draw-bar, thereby preventing the brake mechanism from being operated, (see Figs. 1 and 2.)

The "toggle joint" mechanism described in Figs. 9 and 10 is to be attached to the long rods H′, H′, in like manner as attached to H, H, for the purpose of operating the brake mechanism at the other end of the car, (though not shown in drawings,) and it must be readily seen that as the shafts E′ E², or either of them, are rocked the cams carried thereon will force the supplemental bars backward in the direction of the arrow, thereby straightening the joint combination of links K and K′ whereby the flange J and the ends of links *f* and *f*′ are forced downward and into a straight horizontal position in a similar manner as by the central shaft mechanism above described, and it will be seen that the motion of the long connecting rods H, H, actuated by the rocking motion of the cams, serve to carry the brake-shoes *g, g*, against the edges of the wheels, through the straightening of the links *f* and *f*′, which, as in the construction represented in Figs. 1 and 7 serve as the links of a double "toggle joint."

Having now fully described my brake-mechanism and how it is to be applied, what I claim, and desire to secure by Letters Patent, is—

1. In a brake mechanism, the combination with the brake-shoes and draw-bars by which the vehicle is drawn, three vertical shafts journaled in bearings in position beneath the body of the car, substantially as described; said shafts operatively connected with draw-bars at either end of the car, and with each other, substantially as described, cams and radial arms carried on said shafts, and intermediate mechanism whereby brake shoes can be made to bear forcibly against the peripheries of the wheels, substantially as illustrated and described.

2. In a brake mechanism, the combination with the draw-bar by which the car is drawn, a connecting link pivoted at one end to said draw-bar, said link being provided with a slot at its other end substantially as described, a vertical shaft journaled in bearings centrally beneath the body of the car, provided with a radial arm carrying a stud which operatively connects said central shaft with the draw-bar through intermediate operating mechanism substantially as described, a flange or short radial arms opposite each other also attached to said central shaft, brake bars with brake shoes attached, suspended in position by suitable hanging connections with the under surface of the car or truck frame, and operatively connected with said short radial arms or flange substantially as described whereby the reversal of the draw-bar will cause the brake-shoes to be forced against the peripheries of the wheels nearest to central shaft substantially as described.

3. In combination the draw-bar by which the car is drawn, a link or intermediate mechanism pivotally attached to said draw-bar the other end of said link pivotally connected with a stud on radial arm rigidly connected with vertical shaft, a vertical shaft journaled centrally beneath the body of the car, said shaft provided with a radial arm carrying a stud, a flange or other radial arms also attached to said central shaft, short connecting links pivotally attached to said flange or arm, brake bars with brake-shoes attached placed and held in position convenient to be forced against the peripheries of the wheels, link connections pivotally attached at one end to a bracket on said brake-bars, the other end in like manner attached to the flange or short radial arms whereby the brake shoes are forced against the peripheries of the wheels on their inner surfaces nearest the central shaft substantially as illustrated and described.

4. In a brake mechanism the combination of the draw-bar by which the vehicle is drawn with a connecting link pivoted at one end to said draw-bar, said link being provided with a slot at its opposite end, a vertical shaft at either end of the car, journaled in bearings beneath the platforms of the car, substantially as described; cams on said shafts with radial arms thereto attached, connecting links pivotally attached to said arms, at one end, the other end connected with the slotted portion of the posterior end of the draw-bars, brake-bar with brake shoes attached and placed in position between said cam and wheel at each end of the car and intermediate mechanism whereby the shoes are forced against the periphery of the wheel with each reversed motion of the draw-bar, substantially as described.

5. In a brake mechanism the combination of the draw-bar by which the vehicle is drawn, with vertical shafts through intermediate mechanism and journaled in bearings beneath the platform of a car, at either end thereof, cams carried on said shafts, and radial arms thereto attached, brake bars and supplemental bars placed in parallel positions on either side of said cams, said supplemental bars being operatively connected with its associate brake bar, at the other end of the car respectively, substantially as described whereby one brake-bar is made to be pushed against the periphery of the wheel, and simultaneously therewith, the brake-bar with shoes attached at the other end of the car is forcibly pulled against the periphery of the wheel, by means of the rocking motion of the double cams at either end of the car, actuated by the reversal of the draw-bar (or brakeman) substantially as described.

6. In a brake mechanism the combination of a vertical shaft journaled in bearings beneath the platform of the car, cams carried on said shaft, brake-bars with brake shoes attached and arranged to bear against the peripheries of the wheels, and operatively connected with said cams, through intermediate mechanism, substantially as described, two radial arms attached to said shaft a draw-bar by which the vehicle is drawn, a connecting link between one of the said radial arms and said draw-bar, a connecting link connecting the other radial arm with a short piece of chain leading to the vertical shaft, provided with a wheel or hand-crank by which the cams can be rocked independently of or in conjunction with the reversed motion of the draw-bar, simultaneously, substantially as and for the purpose herein described and set forth.

7. In a brake mechanism, the combination of a vertical shaft at either or both ends of a car, cams carried on said shafts and radial arms thereto attached, said radial arms pivotally connected with the posterior end of the draw-bar, through intermediate mechanism whereby said shafts are rocked with each reversed motion of the draw-bar substantially as described, said draw-bar pivotally connected with a central shaft by means of long links slotted at the end with pivotal-attachments to the long radial arm on said central shaft substantially as described; brake-bars with brake-shoes attached placed in position and adapted to be operated upon, through intermediate mechanism whereby the brake-shoes are forced to bear against the periphery of the wheel with each reverse motion of the draw-bar substantially as described.

8. In a brake mechanism, the combination of a shaft located centrally between the wheels beneath the body of a car, a long radial arm attached thereto, carrying a stud at either end thereof, two connecting links, each being slotted at one end, and pivotally connected with said stud, a short arm or flange rigidly attached also to said central shaft with two short links pivotally connected thereto, brake-bars with brake shoes attached, connected to said short links, (pivotally) substantially as described; said slotted connecting links pivotally connected with the draw-bar by which the vehicle is drawn, said draw-bar slotted posteriorly, permitting a motion rearward, whereby the brake mechanism is operated, to cause the brake shoes to bear against the peripheries of the wheels on their inner edges nearest the shaft, with each reversed motion of the draw-bar at either end of the car, independent of each other, or in conjunction with each other, substantially as described.

9. In a brake mechanism, the combination of a vertical shaft at either or both ends of a car, cams on said shaft with radial arm thereto attached, said radial arm provided with two pivotal connections, the one at the extreme end of said radial arm pivotally connected with the slotted portion of the posterior end of the draw-bar through intermediate mechanism, substantially as described, the other pivotally connected with the extreme posterior end of the draw-bar to which is also pivotally attached one end of the long connecting links which form the connection of the posterior end of the draw-bar with the radial arm on the central shaft substantially as described, brake-bars with brake shoes attached and held in position by suitable hanging attachments to the truck or frame of the car and adapted to be operated upon by intermediate mechanism whereby the brake shoes are caused to bear forcibly against the peripheries of the wheels with each reversed motion of the draw-bars, or either of them, substantially as described.

10. In a brake mechanism, the combination with a vertical shaft at either or both ends of a car, cams carried on said shafts, and with radial arms thereto attached, said radial arms pivotally connected with the slotted posterior end of the draw - bars substantially as described, said radial arms having a second pivotal connection with a long connecting link at one end thereof, the other end of said long connecting link being slotted and pivotally connected with a stud on the long radial arm attached to the central shaft between the two axles, substantially as described; a second radial arm attached to said vertical cam shafts pivotally connected to a connecting link between said arm and the lower end of a vertical crank shaft operated by the brakeman, substantially as described; parallel bars, on either side of the cam shafts and operatively connected with each other, at either or both ends of the car, and with their operative mechanism on either or both sides of each wheel on each axle, whereby the brake shoes are forcibly thrust against the peripheries of the wheels, independently of, or in conjunction with the reverse motion of the drawbar by which the vehicle is drawn, substantially as illustrated and described.

11. In a brake mechanism, the combination of two parallel bars at either or both ends of a car operatively connected by rods with or without turn-buckles or adjusting screws, affixed thereto substantially as described, vertical shafts between said bars and operatively connected with a cam mechanism by which said bars are forced apart, whereby, through intermediate mechanism, brake shoes are made to bear forcibly against the peripheries of the wheels, with the reversal of the draw-bar, by which the vehicle is drawn, substantially as described, radial arms attached to said vertical shafts, and pivotally connected to connecting links and short chains, attached to vertical shafts with hand wheel or crank attached above the platform of the car and whereby the brake mechanism can be operated independently of or in conjunction with the reversal of the drawbar substantially as described, and a suitable spring mechanism, connected with said brake mechanism, whereby the brake shoes are automatically removed from the periphery of the wheel, substantially as described, and a stop-pin mechanism by which the application of the brake shoes to the wheels, can be prevented when so desired, substantially as described.

12. In a brake mechanism the combination of a vertical shaft at either or both ends of the car, cams carried on said shaft and operatively connected with two parallel bars in a horizontal position, substantially as described, said bars operatively connected with two similar parallel bars at the other end of the car, by means of long connecting rods substantially as described, two other brake bars with brake shoes attached, suspended in position centrally between the two axles of the car, by means of suitable hanging connections with the lower surface of the frame, or body of the car, substantially as described, connecting links pivotally attached to said brake bars and to a flange at the other end of said links, and operatively connected by intermediate mechanism with the cam-shafts, through which by being operatively connected with the vertical crank or wheel shaft, operated by the brakeman, the said connecting links are straightened, by which means the brake shoes on the inner brake bars are brought to bear forcibly against the peripheries of the wheels on their inner edges, simultaneously and in conjunction with those on the outer edge, by means of a force applied to the crank-shaft by the brakeman, substantially as described.

13. In a brake mechanism in combination with a vertical shaft at either end of the car, cams carried on said shaft with radial arms thereto attached, a double toggle-joint mechanism by which through intermediate mechanism the brake shoes may be forcibly applied to the peripheries of the wheels with the reversal of the draw-bar, or by force applied by the driver or brakeman, substantially as described.

ROSTO ORRIN WOOD.

Witnesses:
  J. B. WOOD,
  E. J. MINER.